June 1, 1954              D. FRIEND              2,679,946

GASOLINE TANK CAP WITH DOUBLE-ACTING VALVE

Filed May 14, 1951

INVENTOR.
DAWSON FRIEND,
BY:
Harold B. Hood.
ATTORNEY.

Patented June 1, 1954

2,679,946

UNITED STATES PATENT OFFICE 2,679,946

GASOLINE TANK CAP WITH DOUBLE-ACTING VALVE

Dawson Friend, Connersville, Ind., assignor to Stant Manufacturing Company, Inc., Connersville, Ind., a corporation of Indiana Application May 14, 1951, Serial No. 226,179

12 Claims. (Cl. 220—40)

The present invention relates to closure caps for vehicle gasoline tank filler spouts and is primarily concerned with improvements in such caps used with tanks having very short filler spouts.

Tanks of the above type are used chiefly on farm machinery, such as tractors and the like, and are usually not covered, being exposed to sudden and relatively extreme temperature changes. Such conditions cause sudden changes in vapor pressure in the tank and make it necessary to provide valve means in the filler spout cap to compensate for these pressure changes both above and below atmospheric pressure. This invention is directed primarily to an improved valving means for such a filler spout cap.

The user of a vehicle with such a short filler spout usually fills the tank to overflowing before taking it to the field. The rough terrain over which the vehicle must travel causes the fuel in the tank to be thrown toward the filler spout. It is a further object of my invention to provide means in the filler spout cap which will respond to such onrushes of liquid to insure a liquid-tight closure of the vapor valve means above mentioned.

As commercially available, many of such machines are so constructed that fuel feed to the engine from the supply tank is by gravity alone, and that the gravity head for such feed is very short—frequently being only five or six inches. It is a further object of the invention, then, to provide a device of the character described which will operate to admit atmospheric air to the tank very freely, so as to prevent the production of any substantial vacuum within the tank, while effectively guarding against the escape of liquid from the tank except under conditions of extreme and abnormal pressure.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
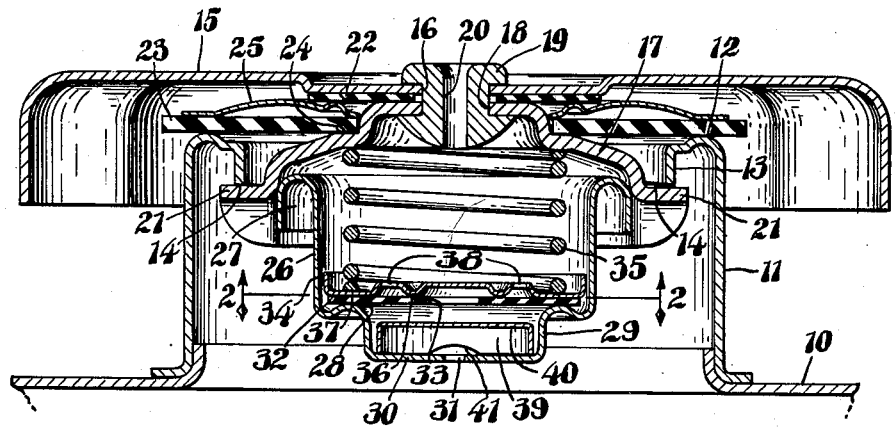
Fig. 1 is a cross-sectional view of a valved cap constructed in accordance with my invention shown in cooperation with a filler spout with which it is primarily intended to be used.
Figure 2:
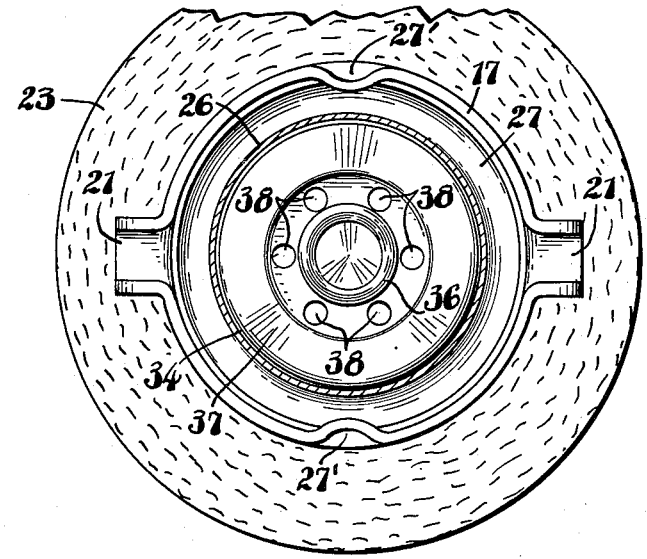
Fig. 2 is a partial sectional view of my invention taken on line 2—2 of Fig. 1.
Figure 3:
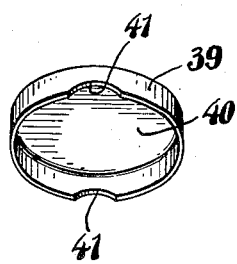
Fig. 3 is a perspective view of an element of my invention.

Referring more particularly to the drawings, I have shown a fragment of a gasoline tank 10 having a short filler spout 11 secured thereto. Spout 11 is of the type having an annular seating surface 12 guarded by a skirt 13 presenting cam surfaces 14 oppositely facing with respect to seating surface 12.

My cap comprises a frame 15 centrally perforated as at 16. A dished element 17 centrally perforated as at 18 is fixedly secured to frame 15 by means of a tubular rivet 19 providing a vent 20 opening to the atmosphere and communicating with the interior of dished element 17. Dished element 17 further provides ears 21 engageable with cam surfaces 14 to shift the cap axially toward the seating surface 12 upon turning movement of the cap relative to spout 11.

Confined between the end of dished element 17 and frame 15 is a gasket 22. A second gasket 23 rests loosely on a seating formation 24 on dished element 17, and a resilient washer 25 is loosely confined between the two said gaskets. When the cap is placed on filler spout 11, as illustrated in Fig. 1, washer 25, at its inner periphery, sealingly engages with gasket 22 and at its outer periphery, urges gasket 23 into sealing engagement with seating surface 12.

A cup element 26 has a rolled rim 27 press fitted into the interior of the dished element 17. Preferably, but not necessarily, the dished element may be crimped over the rim 27, as at 27', to insure against accidental separation of elements 17 and 26.

Spaced downwardly from rim 27, cup element 26 presents an annular valve seat 28 facing toward rivet 19 and has an inverted dome portion 29 depending from the inner periphery of valve seat 28 away from rivet 19, the end 30 thereof being centrally perforated as at 31.

A gasket 32, centrally perforated as at 33, spans the valve seat 28. A discoidal member 34 engages gasket 32 on the side thereof opposite valve seat 28. A coiled spring 35 is confined within cup element 26 and bears against the dished element 17 and discoidal member 34 to bias the discoidal member against gasket 32 and the gasket against valve seat 28.

Discoidal member 34 comprises a first annular rib 36 engageable with gasket 32 around the central perforation 33, a second annular rib 37 engaging gasket 32 in registry with valve seat 28, and a plurality of ports 38 between the two said ribs but spaced from the plane thereof away from gasket 32.

Loosely carried in dome portion 29 is an inverted cup member 39 spanning perforation 31 therein. The bottom 40 of member 39 is normally spaced slightly from the gasket 32 and the lateral wall thereof is spaced slightly inwardly from the dome wall, both the dome portion 29 and cup member 39 preferably being cylindrical in cross-section. I have provided a plurality of relatively shallow notches 41 interrupting the rim of cup element 39, this for a purpose later to become apparent.

*Operation*

In use, the cap is placed on the filler neck in the position shown in Fig. 1. Vapor pressure which is built up in tank 10 passes through perforation 31 into the dome portion 29 beneath the cup element 31, escaping through rim notches 41; between the walls of elements 29 and 39, and into the region above element 39, so long as the vapor flow is very slow.

It will be seen from an examination of Fig. 1 that the gasket 32 is supported against gravity solely by the seat 28 which underlies the outer peripheral region of said gasket, the central region of the gasket having no external support. Thus, the position of that central region of the gasket under balanced pressure conditions will be dependent upon the proportions and the inherent stiffness or resiliency of the gasket. Preferably, I use a gasket so proportioned and constructed that, when new, its central region will, under balanced pressure conditions, just engage the rib 36 under no significant tension. Any slightest pressure change which raises the pressure within the tank above current atmospheric value thus will press the gasket 32 more tightly against said rib to prevent fluid escape from the tank unless and until the pressure differential rises to a value sufficient to overcome the force of the spring 35. Any slightest change in the opposite direction, however, will permit atmospheric pressure to move the central region of the gasket away from the rib 36 to permit air flow into the tank to break any vacuum therein, said gasket offering no measurable resistance to such air flow.

With advancing age, however, the gasket 32 loses its inherent rigidity or resiliency and sometimes sags away from rib 36. Relatively rapid vapor or liquid flow toward the vent 20 will usually, but not inevitably, overcome this deformation and force the gasket back to its seating position on rib 36; but in order to ensure proper seating of the gasket in response to surges of liquid or vapor, and in response to even a slow rise in liquid level resulting from liquid expansion due to radical temperature changes, I have provided the cup member 39. As slowly rising liquid enters the dome portion 29 through perforation 31, the cup member 39, due to vapor entrapped therein, floats. As the liquid level rises, the bottom 40 of member 39 is forced against gasket 32 and in turn forces the gasket against the rib 36, thus preventing liquid escape through ports 38. When either liquid or vapor rushes or surges through the port 31 at relatively high velocity, the cup 39 will be entrained therewith to seat the gasket in a similar manner.

While I have described my invention for use with a vehicle gasoline tank, it should be apparent that it may be used with equally satisfactory results wherever the described conditions of liquid and vapor pressure might occur.

I claim as my invention:

1. A pressure-vacuum valve comprising an annular valve seat, a discoidal member, a centrally perforated gasket loosely confined between said valve seat and said discoidal member, spring means biasing said discoidal member against said gasket and said gasket against said valve seat, said discoidal member having a first annular rib engageable with said gasket around the central perforation therein, a second annular rib concentric with said first annular rib engaging said gasket in registry with said annular valve seat, and a plurality of ports between said first and second annular ribs but spaced from the plane thereof away from said gasket, and means oppositely spaced from said plane and movable, in response to fluid movement toward said ports, to press said gasket into engagement with said first annular rib.

2. The valve of claim 1 in which said means comprises an inverted cup member opening away from said gasket and loosely supported in a position spaced slightly therefrom, said cup member being adapted to float on liquid approaching said valve seat to close the central perforation in said gasket and to force said gasket into sealing engagement with said first annular rib.

3. A two-way valve comprising an annular valve seat having an inverted cylindrical dome portion depending from the inner periphery of said valve seat, and having a central perforation in the end thereof, an inverted, cylindrical cup member supported loosely in said dome spanning the central perforation therein, the cylindrical wall thereof being spaced slightly inwardly from the cylindrical wall of said dome portion and the bottom of said cup member being spaced slightly below the plane of said annular valve seat, and valve means cooperable with said annular valve seat comprising a discoidal member, a centrally perforated gasket loosely confined between said member and said valve seat, a coiled spring biasing said discoidal member against said gasket and said gasket against said valve seat, said discoidal member having a first annular rib engageable with said gasket around the central perforation thereof, a second annular rib concentric with said first annular rib engaging the gasket in registry with said annular valve seat, and a plurality of ports between said first and second annular ribs but spaced from the plane of said gasket away from said dome portion, said cup member being adapted to float on liquid approaching said valve seat to span and close the central perforation in said gasket and to force said gasket into sealing engagement with said first annular rib.

4. The device of claim 3 in which the rim of said cup member is interrupted by a plurality of relatively shallow notches.

5. For use with a vehicle gasoline tank filler spout having an annular seating surface guarded by a skirt presenting cam surfaces oppositely facing with respect to said seating surface, a closure cap comprising means for cooperation with said cam surfaces to move said cap axially toward said seating surface upon turning movement of said cap relative to said spout; a cup element fixed to said cap, said cap being provided with a vent opening to the atmosphere and communicating with the interior of said cup element, said cup element providing, in a region of said cup element remote from said vent, an annular valve seat facing said vent within said cup element, and said cup element further having a centrally perforated dome portion spaced out of the plane of said valve seat away from said vent, a first valve means carried within said cup element for cooperation with said valve seat and comprising a discoidal member, a centrally perforated gasket loosely confined between said member and said valve seat, means carried within said cup element biasing said discoidal member against said gasket and said gasket against said valve seat, said discoidal member having a first annular rib engageable with said gasket around the central perforation thereof, a second annular rib concentric with said first annular rib engaging the gasket in registry with said annular valve seat, and a plurality of ports between said first and second annular ribs but spaced from the plane of said gasket toward said vent, and means carried in said dome portion and movable under the influence of fluid flow to hold said gasket in engagement with said first annular rib.

6. The device of claim 5 in which the last said means comprises an inverted cup member loosely carried in said dome portion between the perforated end thereof and said gasket and opening away from said gasket, the bottom of said member being spaced slightly downwardly from said gasket and the lateral wall thereof being spaced slightly inwardly from the wall of said dome portion, said cup member being adapted to float on liquid approaching said valve seat to close the central perforation in said gasket and to force said gasket into sealing engagement with said first annular rib.

7. The device of claim 6 in which the rim of said cup member is interrupted by a plurality of relatively shallow notches.

8. For use with a vehicle gasoline tank filler spout having an annular seating surface guarded by a skirt presenting cam surfaces oppositely facing with respect to said seating surface, a closure cap comprising a frame having a central perforation therein and carrying resilient gasket means for engaging said annular seating surface, a dished element having a central perforation therein and cam lugs for engaging said cam surfaces to shift the cap axially toward said seating surface upon turning movement thereof relative to said spout, a hollow rivet passing through said central perforations in said frame and said dished element to fixedly secure said dished element to said frame, a cup element interiorly fixed in said dished element with the mouth thereof facing said rivet and having, in a region thereof remote from said rivet, an annular valve seat facing said rivet within said cup element, said cup element further having a centrally perforated dome portion spaced out of the plane of said valve seat away from said rivet, a first valve means carried within said cup element for cooperation with said valve seat comprising a discoidal member, a centrally perforated gasket loosely confined between said member and said valve seat, a coiled spring carried within said dished element and said cup element biasing said discoidal member against said gasket and said gasket against said valve seat, said discoidal member having a first annular rib engageable with said gasket around the central perforation thereof, a second annular rib concentric with said first annular rib engaging the gasket in registry with said annular valve seat, and a plurality of ports between said first and second annular ribs but spaced from the plane of said gasket toward said rivet, and means carried in said dome portion and movable under the influence of fluid flow to hold said gasket in engagement with said first annular rib.

9. The device of claim 8 in which the last said means comprises an inverted cup member loosely carried in said dome portion between the perforated end thereof and said gasket and opening away from said gasket, the bottom of said member being spaced slightly downwardly from said gasket and the lateral wall thereof being spaced slightly inwardly from the wall of said dome portion, said cup member being adapted to float on liquid approaching said valve seat to close the central perforation in said gasket and to force said gasket into sealing engagement with said first annular rib.

10. The device of claim 9 in which the rim of said cup member is interrupted by a plurality of relatively shallow notches.

11. For use with a container having a filler spout providing a skirted seating surface, a closure cap comprising a frame, sealing means carried by said frame and engageable with a spout seating surface, retaining means carried by said frame and engageable with a spout skirt to move said sealing means into engagement with such a seating surface, a cup element carried by said frame and providing a perforated end wall and a valve seat axially spaced from said end wall, said frame being provided with a vent opening through which the interior of said cup communicates with atmosphere a centrally-perforated gasket seated on said valve seat, a discoidal element, spring means acting upon said discoidal element to press the same against that surface of said gasket remote from said valve seat, said discoidal element having an annular seating surface presented toward said gasket and located radially inward with respect to said valve seat but radially outside the perforation in said gasket, and said discoidal element further being perforate in a region between its seating surface and said valve seat, and a float disposed between the end wall of said cup element and said gasket, said float having an imperforate wall located to span said gasket perforation and the perforation in said cup element end wall.

12. The closure cap of claim 11 in which said float comprises a plane wall and a perimetral flange, said flange normally resting on said cup element end wall, and the edge of said flange being notched.

References Cited in the file of this patent

UNITED STATES PATENTS

| Number | Name | Date |
|---|---|---|
| 1,885,121 | Loweke | Nov. 1, 1932 |
| 2,015,915 | Adsit | Oct. 1, 1935 |
| 2,133,575 | Rosenberg | Oct. 18, 1938 |
| 2,154,113 | Smith | Apr. 11, 1939 |
| 2,181,969 | Eshbaugh | Dec. 5, 1939 |
| 2,528,796 | Smith | Nov. 7, 1940 |
| 2,203,801 | Swank | June 11, 1940 |
| 2,528,791 | Scoville | Nov. 7, 1950 |